United States Patent
Nagamine et al.

(10) Patent No.: US 10,193,114 B2
(45) Date of Patent: Jan. 29, 2019

(54) ELECTRICITY STORAGE DEVICE

(71) Applicants: Koichi Nagamine, Toyota (JP); Masahiko Kitamura, Nisshin (JP)

(72) Inventors: Koichi Nagamine, Toyota (JP); Masahiko Kitamura, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 906 days.

(21) Appl. No.: 14/425,524

(22) PCT Filed: Nov. 27, 2013

(86) PCT No.: PCT/IB2013/002930
§ 371 (c)(1),
(2) Date: Mar. 3, 2015

(87) PCT Pub. No.: WO2014/087234
PCT Pub. Date: Jun. 12, 2014

(65) Prior Publication Data
US 2015/0228947 A1    Aug. 13, 2015

(30) Foreign Application Priority Data
Dec. 4, 2012 (JP) ................................. 2012-264988

(51) Int. Cl.
*H01M 2/10* (2006.01)
*H01M 2/12* (2006.01)
(Continued)

(52) U.S. Cl.
CPC ........... *H01M 2/12* (2013.01); *H01M 2/1077* (2013.01); *H01M 2/1276* (2013.01);
(Continued)

(58) Field of Classification Search
CPC ............ H01M 10/613; H01M 10/625; H01M 10/647; H01M 10/6556; H01M 10/6557;
(Continued)

(56) References Cited

U.S. PATENT DOCUMENTS 7,264,901 B2    9/2007 Gow et al.
2005/0170239 A1*    8/2005 Uemoto .............. H01M 10/625
429/120
(Continued)

FOREIGN PATENT DOCUMENTS

EP    1848051 A1    10/2007
JP    2012-109126 A    6/2012
(Continued)

*Primary Examiner* — Miriam Stagg
*Assistant Examiner* — Lilia Nedialkova
(74) *Attorney, Agent, or Firm* — Sughrue Mion, PLLC

(57) ABSTRACT

An electricity storage device includes: a plurality of batteries juxtaposed in a first direction, each battery having on a first side a gas discharge valve that discharges a gas produced inside the battery; and a cooling path formed between the plurality of batteries that face each other in the first direction, constructed to convey a coolant that cools the batteries, and an intake opening for taking in the coolant on a second side that is an opposite side to the first side in a second direction orthogonal to the first direction and a discharge opening for discharging the coolant taken in on at least one of sides in a third direction orthogonal to the second direction and to the first direction.

8 Claims, 7 Drawing Sheets

(51) Int. Cl.
*H01M 10/625* (2014.01)
*H01M 10/6556* (2014.01)
*H01M 10/6557* (2014.01)
*H01M 10/613* (2014.01)
*H01M 10/6563* (2014.01)
*H01M 10/647* (2014.01)

(52) U.S. Cl.
CPC ....... *H01M 10/613* (2015.04); *H01M 10/625* (2015.04); *H01M 10/6556* (2015.04); *H01M 10/6557* (2015.04); *H01M 10/647* (2015.04); *H01M 10/6563* (2015.04); *H01M 2220/20* (2013.01)

(58) Field of Classification Search
CPC .. H01M 10/6563; H01M 2/1077; H01M 2/12; H01M 2/1276; H01M 2220/20
See application file for complete search history.

(56) References Cited

U.S. PATENT DOCUMENTS

| | | | | |
|---|---|---|---|---|
| 2009/0061289 A1* | 3/2009 | Hamada | ................... | H01M 2/08 429/53 |
| 2012/0009446 A1* | 1/2012 | Mizuguchi | .......... | H01M 2/1077 429/71 |
| 2012/0009456 A1* | 1/2012 | Sohn | ................... | H01M 2/1077 429/120 |
| 2012/0034526 A1* | 2/2012 | Kurahashi | ........... | H01M 2/1673 429/221 |
| 2013/0149583 A1* | 6/2013 | Kurita | ................ | H01M 2/1077 429/120 |
| 2013/0273397 A1 | 10/2013 | Watanabe et al. | | |

FOREIGN PATENT DOCUMENTS

| | | | | |
|---|---|---|---|---|
| JP | 2012-113961 A | | 6/2012 | |
| JP | 2012-129043 A | | 7/2012 | |
| KR | 100993127 B1 | | 11/2010 | |
| KR | 101106111 B1 | | 1/2012 | |
| WO | WO-2012063567 A1 * | 5/2012 | .......... | H01M 2/1077 |

* cited by examiner

ELECTRICITY STORAGE DEVICE

BACKGROUND OF THE INVENTION

1. Field of the Invention

The invention relates to an electricity storage device.

2. Description of Related Art

There exists an electricity storage device which has: a plurality of electricity storage elements that are juxtaposed in a predetermined direction and that is each equipped with a valve that discharges gas produced inside; a pair of end plates that clamp the electricity storage elements in the predetermined direction; a plurality of connecting members that extend in the predetermined direction and that are fixed to the two end plates; and a case for housing the electricity storage elements, and in which the connecting members are disposed along external surfaces of the electricity storage elements on which the valves are provided, and contact an internal wall surface of the case, and form, together with the case, a space in which gas discharged from the valves moves (see, e.g., Japanese Patent Application Publication No. 2012-109126 (JP-A-2012-109126)). In this electricity storage device, air that cools the electricity storage elements flows in a longitudinal direction, that is, from a side opposite to the side where the valves are provided toward the side where the valves are provided. The air having cooled the electricity storage elements is discharged to an outside through a discharge path that is shared with the gas discharged from the valves.

SUMMARY OF THE INVENTION

However, in the construction described in JP-A-2012-109126, the air that cools the electricity storage elements flows from an intake opening that is provided on the opposite side to the side provided with valves toward a discharge opening that is provided on the valve-provided side, and this flowing direction gives rise to a problem that a cooling path for the battery and a discharge path for gas produced inside the battery (a smoke discharge path) cannot be separated from each other.

Accordingly, the invention provides an electricity storage device in which a cooling path for a battery and a smoke discharge path can be separated from each other.

According to an aspect of the invention, an electricity storage device includes: a plurality of batteries juxtaposed in a first direction, each battery having on a first side a gas discharge valve that discharges a gas produced inside the battery; and a cooling path formed between the plurality of batteries that face each other in the first direction, constructed to convey a coolant that cools the batteries, and having an intake opening for taking in the coolant on a second side that is an opposite side to the first side in a second direction orthogonal to the first direction and a discharge opening for discharging the coolant taken in on at least one of sides in a third direction orthogonal to the second direction and to the first direction.

Furthermore, in the foregoing aspect, the discharge opening may be provided on each of a third side and a fourth side that are two sides in the third direction.

Furthermore, in the foregoing aspect, a sectional area of the intake opening may be smaller than a sectional area of the discharge opening provided on at least one of the sides in the third direction. Further, the sectional area of the intake opening may be smaller than a sum of a sectional area of the discharge opening on a third side that is a side in the third direction and a sectional area of the discharge opening on a fourth side that is another side in the third direction.

Furthermore, in the foregoing aspect, the cooling path may have a T shape as a whole in a section orthogonal to the first direction, and may include a path portion that extends from the intake opening toward the first side and then extends toward a third side that is a side in the third direction and a path portion that extends from the intake opening toward the first side and then extends toward a fourth side that is another side in the third direction.

Furthermore, in the foregoing aspect, the electricity storage device may further include: a partition plate provided between the plurality of batteries in the first direction and having a rib, and the cooling path may be at least partially defined by the rib.

Furthermore, in the foregoing construction, the rib may extend from the second side to the first side in the second direction and turns into the third direction.

Furthermore, in the foregoing aspect, the electricity storage device may further include a smoke discharge path formed for the plurality of batteries at the first side in the second direction and constructed to discharge to an outside the gas discharged from the gas discharge valve of each battery, and the cooling path may be formed in such a manner that the cooling path does not communicate with the smoke discharge path.

Furthermore, in the foregoing aspect, the electricity storage device may further include: a plurality of partition plates provided between the plurality of batteries that face each other in the first direction and, each partition plate having connecting portions that are protruded at the second side in the second direction and that extend in two rows in the first direction; and a cover member disposed for the connecting portions of the plurality of partition plates at the second side in the second direction, and a supply path for supplying the coolant to the cooling path may be at least partially defined by the cover member and the connecting portions of the partition plates.

Furthermore, in the foregoing aspect, the electricity storage device may further include: a plurality of partition plates provided between the plurality of batteries that face each other in the first direction and, each partition plate having connecting portions that are protruded at the first side in the second direction and that extend in two rows in the first direction; a cover member disposed for the connecting portions of the plurality of partition plates at the first side in the second direction; a pair of end plates disposed on two end sides of the plurality of batteries in the first direction; and an arresting member whose two ends are coupled to the pair of end plates and which extends over the plurality of batteries in the first direction at the first side in the second direction and which gives arresting force in the first direction to the plurality of batteries, and a smoke discharge path constructed to discharge to an outside the gas discharged from the gas discharge valve of each battery may be at least partially defined by the cover member and the connecting portions of the partition plates, and the connecting portions may define, inside the connecting portions, hollow portions that extend in the first direction, and the arresting member may extend in at least one of the hollow portions.

Furthermore, in the foregoing construction, the cover member may be made of metal.

According to the foregoing aspect, an electricity storage device that allows a battery cooling path and a smoke discharge path to be separated from each other can be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Best modes for carrying out the invention will be described hereinafter with reference to the drawings.

Figure 1:
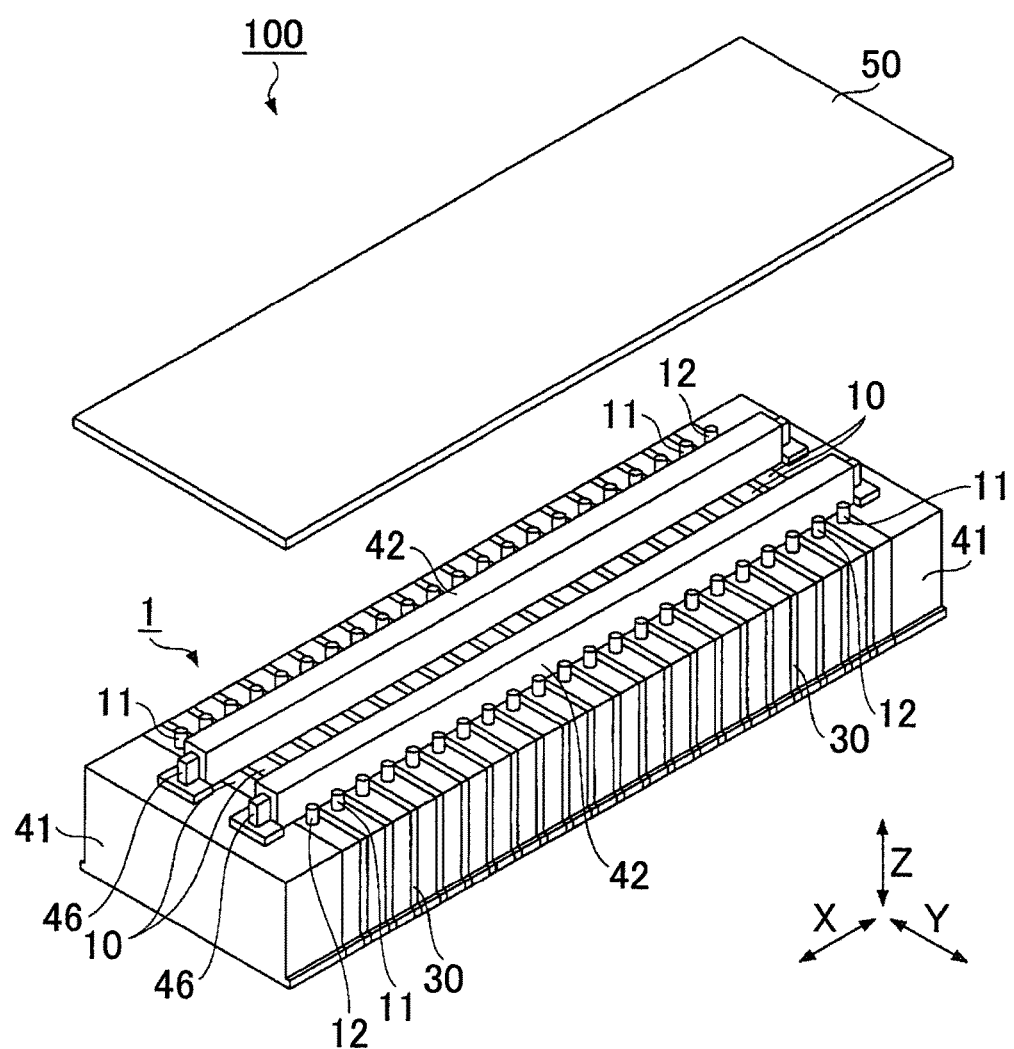
FIG. 1 is an external view schematically showing a battery pack 100 according to an embodiment of the invention.
Figure 2:
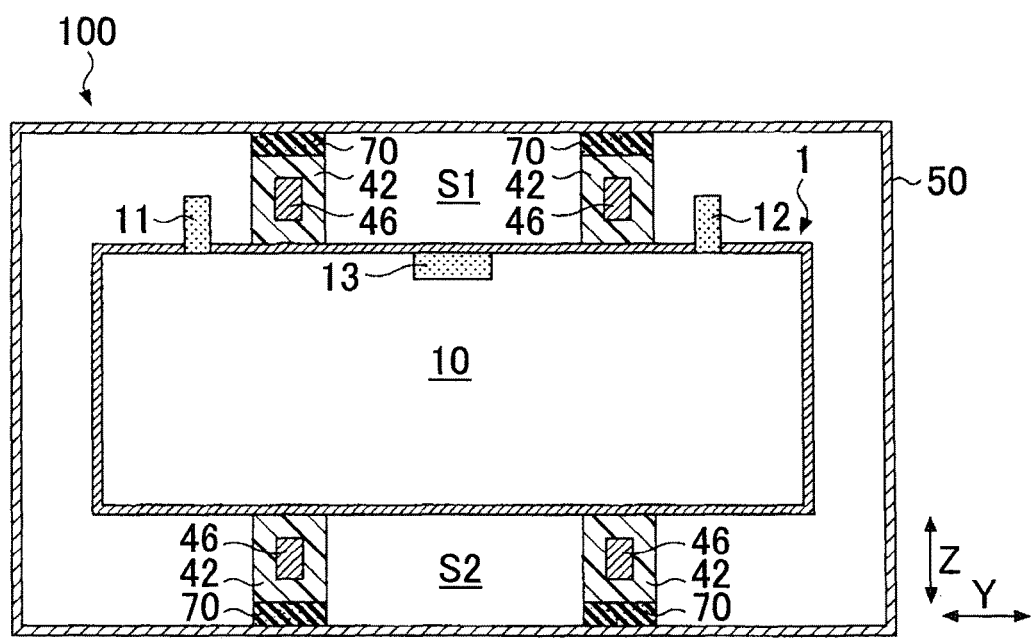
FIG. 2 is a diagram schematically showing a section of the battery pack 100 taken on a Y-Z plane.

FIG. 1 is an external view schematically showing a battery pack 100 according to an embodiment of the invention. In FIG. 1, a pack case 50, only an upper portion of which is shown, is apart from a battery stack 1 for the sake of convenience in illustration. FIG. 2 is a diagram schematically showing a sectional view of the battery pack 100 taken on a Y-Z plane. In FIG. 1 and FIG. 2, X directions, Y directions and Z directions are orthogonal to one another. Incidentally, although up-down directions, left-right directions, etc. change according to the mounted state of the electricity storage device or the direction of view, it is assumed in the following description that the Z directions correspond to vertical directions (up-down directions) and an upper side in the drawings is an "upper side" with reference to the illustration in each drawing, for the sake of convenience. Furthermore, the Y directions are assumed to correspond to the left-right directions with reference to the illustrations in the drawings.

The battery pack 100 can be mounted in a vehicle. Such vehicles include hybrid motor vehicles and electric motor vehicles. A hybrid motor vehicle is a vehicle equipped with an electric motor and an internal combustion engine as motive power sources for moving the vehicle. An electric motor vehicle is a vehicle equipped with only an electric motor as a motive power source of the vehicle. In either type of vehicle, the battery pack 100 may be used as an electric power source of the electric motor.

The battery pack 100 includes the battery stack 1 and the pack case 50.

The battery stack 1 has a plurality of electric cells 10. The electric cells 10 are juxtaposed (stacked) in the X directions as shown in FIG. 1.

The pack case 50 is an example of a cover member, and is an exterior package that houses the entire battery stack 1. That is, the pack case 50 is provided so as to cover the upper and lower surfaces (end surfaces in the Z directions), two opposite side surfaces (end surfaces in the Y directions), and other two opposite side surfaces (end surfaces in the X directions) of the entire battery stack 1. The pack case 50 may be formed from a metal (e.g., a platy metal member). The pack case 50 may also be constructed by combining a plurality of members. Ducts, such as an air intake duct 61, a smoke discharge duct 62, etc., may be connected to the pack case 50 so as to communicate with the inside of the pack case 50 (see FIG. 5).

The electric cells 10 may be any secondary cells such as nickel-hydrogen cells or lithium-ion cells. Furthermore, the electric cells 10 may also be electric double layer capacitors (condensers) instead of secondary cells. The number of electric cells 10 may be determined as appropriate on the basis of the demanded output of the battery stack 1 and the like.

The upper surface of each electric cell 10 is provided with a positive terminal 11 and a negative terminal 12. The positive terminal 11 and the negative terminal 12 of each electric cell 10 are provided apart from each other by a predetermined distance. The electric cells 10 may be electrically connected in series. Concretely, the positive terminal 11 of one electric cell 10 and the negative terminal 12 of another electric cell 10 may be electrically connected by a bus bar (not shown). That is, the electric cells 10 may be electrically connected in series.

A valve 13 is provided on the upper surface of each electric cell 10. The valve 13 is used to discharge gas produced inside the electric cell 10 to the outside of the electric cell 10. Since the inside of the electric cell 10 is tightly closed, the internal pressure of the electric cell 10 rises as gas is produced inside the electric cell 10 if any is produced. When the internal pressure of the electric cell 10 reaches an actuation pressure of the valve 13, the valve 13 changes from a closed state to an open state. In this manner, the gas produced inside the electric cell 10 can be discharged to the outside of the electric cell 10.

The valve 13 is disposed between the positive terminal 11 and the negative terminal 12 in the Y directions. In the example shown in FIG. 1, the valve 13 is disposed at a position that is equidistant from the positive terminal 11 and the negative terminal 12. Due to the provision of the valve 13 on the upper surface of the electric cell 10, the gas produced inside the electric cell 10 can easily be discharged from the valve 13. Incidentally, the position at which the valve 13 is provided can be set as appropriate.

Incidentally, the construction of the valve 13 is arbitrary, and may be, for example, a generally termed rupture valve or a generally termed return valve. The rupture valve is a valve that irreversibly changes from the closed state to the open state. For example, a rupture valve can be constructed by forming a marking on a portion of the battery case. The return valve is a valve that reversibly changes between the closed state and the open state. That is, the return valve changes between the closed state and the open state according to the magnitude relation between the pressure inside the electric cell 10 and the pressure outside. The return valve can be constructed, for example, of a lid that closes a gas movement path and a spring that urges the lid in one direction.

A partition member 30 is disposed between two electric cells 10 adjacent to each other in the X directions. Each partition member 30 functions as a spacer. The partition members 30 may be formed from an insulation material such as resin or the like. Each partition member 30 has a plurality of connecting portions 42 that are protruded upward or downward as shown in FIG. 2. Concretely, each partition member 30 has two connecting portions 42 that are protruded from an upper side thereof at the two opposite sides of the valve 13 in the Y directions, and has two similar connecting portions 42 that are protruded from the lower side of the partition member 30. Incidentally, the heights (lengths in the Z directions) and positions of the connecting portions 42 may be different between the upper side and the lower side. Incidentally, further details of the partition member 30 will be described later.

A pair of end plates 41 are disposed at two opposite ends of the battery stack 1 in the X directions. Arresting members (flat plate bands) 46 are coupled to the end plates 41. Two arresting members 46 may be provided at an upper side of the battery stack 1. The two arresting members 46 are apart from each other in the Y directions, and extend in the X directions, and are each connected at its two opposite ends to the two end plates 41 Incidentally, the method of fixing the arresting members 46 to the end plates 41 is arbitrary; for example, a fixing method that uses bolts, a fixing method that uses rivets, and other fixing methods, such as welding, can be used. Similarly, two arresting members 46 may also be provided at the lower side of the battery stack 1. The arresting members 46 have a function of giving arresting force to the plurality of electric cells 10. The arresting force is a force that clamps the electric cells 10 in the X directions. By giving arresting force to the electric cells 10, the electric cells 10 can be, for example, restrained from expanding. In the construction in which two arresting members 46 are provided on each of the upper and lower sides of the battery stack 1, concentration of arresting force to a single site is prevented, and substantially equal arresting forces can be given to the electric cells 10.

A smoke discharge path S1 is formed at the upper surface side of the electric cell 10, as shown in FIG. 2. The smoke discharge path S1 communicates with the inside of each electric cell 10 via the valve 13 of the electric cell 10. Therefore, the smoke discharge path S1 serves to discharge the gas produced inside each electric cell 10 to the outside of the battery pack 100. The smoke, discharge path S1, as shown in FIG. 2, is defined by the upper-side connecting portions 42 of each partition member 30, the pack case 50 and the upper surfaces of the electric cells 10. The smoke discharge path S1 may extend in the X directions, and may be open at one of the two ends (see FIG. 5) and closed at the other end. Preferably, seal members 70 are provided between the pack case 50 and upper edges of the upper-side connecting portions 42 of each partition member 30. The seal members 70 may be formed from, for example, sponge or rubber. The seal members 70 extend in the X directions along the connected connecting portions 42 at the upper side of the partition members 30. The provision of the seal members 70 improves air-tightness, and reduces leakage of gas from the smoke discharge path S1. Incidentally, the smoke discharge path S1 may have a consistent cross-section or may have a cross-section that changes from one side toward the other in the X directions.

A supply path S2 is formed at a lower surface side of the electric cells 10, as shown in FIG. 2. The supply path S2 is supplied with coolant from a coolant supply source (not shown) provided outside. The coolant is typically a gas such as air, but may also be another type of fluid, such as water or the like. Incidentally, the coolant is assumed to be air in the following description. The supply path S2, as shown in FIG. 2, is defined by the lower-side connecting portions 42 of each partition member 30, the pack case 50 and the lower surfaces of the electric cells 10. The supply path S2 may extend in the X directions, and may be open at one of the two ends (see FIG. 5) and closed at the other end. Seal members 70 may be provided between the pack case 50 and lower edges of the lower-side connecting portions 42 of the partition members 30. The provision of the seal members 70 improves air-tightness, and reduces leakage of the coolant that passes through the supply path S2. Incidentally, the supply path S2 may have a consistent cross-section, or may also have a cross-section that changes from one side to the other side in the X directions.

Figure 3:
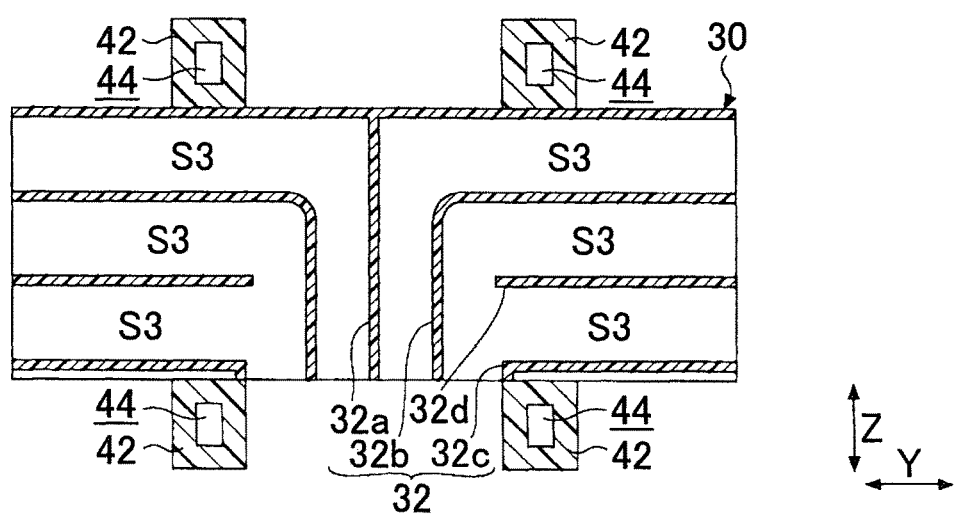
FIG. 3 is a diagram schematically showing an example of a partition member 30 in a view taken in an X direction.
Figure 4:
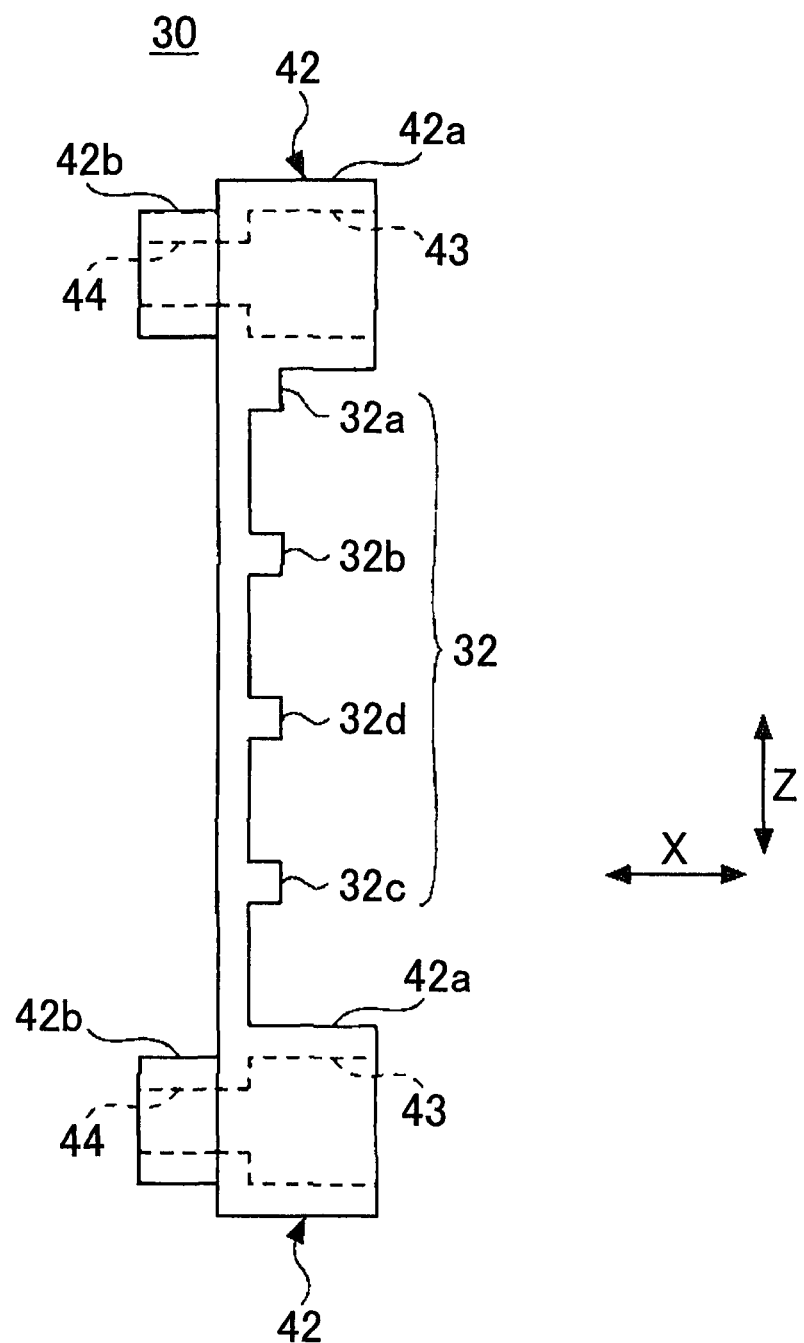
FIG. 4 is a diagram schematically showing an example of the partition member 30 in a view taken in a Y direction.

FIG. 3 is a diagram schematically showing an example of a partition member 30 in a view taken in one of the X directions. FIG. 4 is a diagram showing an example of a partition member 30 in a view taken in one of the Y directions.

Each partition member 30 has connecting portions 42 on its upper and lower portions. The connecting portions 42 are provided at two locations on the upper portion and at two locations on lower portion. The connecting portions 42 are protruded upward and downward relative to the upper surface and the lower surface of each electric cell 10, as shown in FIG. 2. The connecting portions 42, as shown in FIG. 3, are formed so as to be hollow in a view in the X directions. That is, each of the connecting portions 42 has a hole 44 that extends in the X directions. Besides, the connecting portions 42 extend in the X directions as shown in FIG. 4. Each connecting portion 42, as shown in FIG. 4, has a large-diameter portion 42a and a small-diameter portion 42b. Two partition members 30 adjacent to each other in the X directions are interconnected by fitting the small-diameter portions 42b of the connecting portions 42 of one of the two partition members 30 into holes 43 of the large-diameter portions 42a of the other partition member 30. In this connected state, the upper-side connecting portions 42 of the partition members 30 define two side wall portions of the smoke discharge path S1 (see FIG. 2) that extend in the X directions. Furthermore, in this connected state, the holes 44 in the connecting portions 42 are connected to each other so as to form hollow portions that extend in the X directions. The arresting members 46 (see FIG. 2) made of metal are inserted through the hollow portions. Furthermore, in this connected state, a space between two partition members 30 adjacent to each other in the X directions accommodates placement of a corresponding one of the electric cells 10. That is, because two partition members 30 are interconnected while being positioned on two opposite sides of an electric cell 10 in the X directions, the electric cell 10 is disposed between the two partition members 30 adjacent to each other in the X directions.

Each partition member 30 has on a surface that faces one of the two adjacent electric cells 10 a plurality of ribs 32 that are protruded in an X direction. In each partition member 30, a surface opposite to the surface provided with the ribs 32, that is, a surface that faces the other one of the adjacent electric cells 10, may be a flat surface that has a surface contact with the electric cell 10 (see FIG. 4).

The ribs 32 are formed in the shape of T as a whole as shown in FIG. 3. That is, the ribs 32 extend in one of the Z directions from the lower side (air intake side), and then turn their direction into the Y directions. Therefore, the ribs 32 define T-shaped cooling paths S3 that extend in a Z direction from the lower side (air intake side), and then turn their direction into the Y directions, and extend toward the two edge portions of the partition member 30 in the Y directions.

That is, there are defined the cooling paths S3 for causing the coolant to flow in the T-shaped course on the end surface of the electric cell 10 (end surface in the X direction). In an example shown in FIG. 3, the ribs 32 are formed symmetrically about a center line along the Z directions that passes through a center of the partition member 30 in the Y directions. Concretely, a central rib 32a extends in the Z direction from a center of the lower side of the partition member 30 in the Y directions, and then forks toward the two opposite sides (left and right sides) in the Y directions. Ribs 32b and 32c on the right side extend in the Z direction from the lower side of the partition member 30, and then turn their direction to one of the. Y directions (the rightward direction) and extend in that direction. The ribs 32b and 32c on the left side extend in the Z direction from the lower side, and turn their direction to the other one of the Y directions (the leftward direction) and extend in that direction. Ribs 32d extend in the Y directions.

Incidentally, the number of ribs 32, and the intervals between two mutually adjacent ribs 32 can be set as appropriate. Furthermore, the heights of the ribs 32 (the heights in the X directions) are arbitrary, and can be set as appropriate. For example, the heights of the ribs 32 may be set so that distal ends of the ribs 32 contact the adjacent electric cell 10, or may also be set so that the distal ends of the ribs 32 do not contact the electric cell 10. However, as described below, in order to prevent mixture of streams of the coolant moving though the cooling paths S3 defined by ribs 32 (in order to cause the coolant to flow through a T-shaped course on the end surface of the electric cell 10 (the end surface thereof in the X direction), the heights of the ribs 32 are preferably set so that the distal ends of the ribs 32 contact the end surface of the electric cell 10 in the X direction. Incidentally, the ribs 32 may be formed on both sides of each partition member 30.

Figure 5:
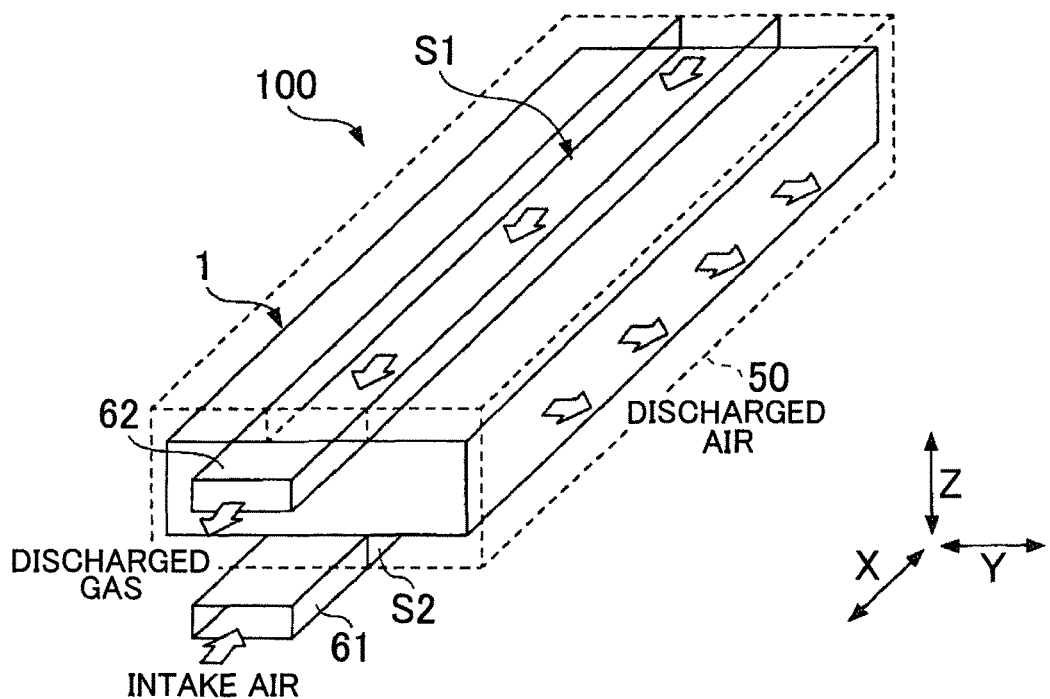
FIG. 5 is a diagram schematically showing a manner in which a coolant (air) and a gas flow in the battery pack 100.

FIG. 5 is a diagram schematically showing a manner in which the coolant (air in this example) and a gas flow in the battery pack 100.

In the example shown in FIG. 5, an air intake duct 61 is connected to the pack case 50 at the lower side of the battery pack 100 in such a manner as to communicate with a supply path S2 that is formed at the lower side of the battery stack 1. Incidentally, when the battery pack 100 is mounted in a vehicle, the air intake duct 61 may be disposed so that an air intake opening of the air intake duct 61 faces the inside of a cabin of the vehicle. The air intake duct 61 may be provided with means (e.g., a blower) for adjusting the flow (flow velocity) of air to be supplied. Incidentally, a connecting portion between the air intake duct 61 and the supply path S2 may be provided with a seal member (not shown). As for the supply path S2, as stated above, the other side end, that is, the opposite side end to the side end portion connected to the air intake duct 61, may be sealed. In the example shown in FIG. 5, the supply path S2 is sealed at the deep side in the X directions in the drawing.

Furthermore, a smoke discharge duct 62 is connected to the pack case 50 at the upper side of the battery pack 100 in such a manner as to communicate with the smoke discharge path S1 that is formed at the upper side of the battery stack 1. The smoke discharge duct 62 may be provided with means (e.g., a blower) for adjusting the flow (flow velocity) of gas to be discharged. Incidentally, a connecting portion between the smoke discharge duct 62 and the smoke discharge path S1 may be provided with a seal member (not shown). As for the smoke discharge path S1, as mentioned above, the other side end, that is, the opposite side end to the side end portion connected to the smoke discharge duct 62, may be sealed. In the example shown in FIG. 5, the smoke discharge path S1 is sealed at the deep side in the X directions in the drawing. However, the smoke discharge duct 62 may be connected to the deep side end portion of the smoke discharge path S1 in the drawing, and the near-side end portion of the smoke discharge path S1 in the drawing may be sealed. Furthermore, the smoke discharge path S1 may also be connected at its both ends to the smoke discharge duct 62.

Incidentally, as shown in FIG. 5, the gas introduced into the smoke discharge path S1 from the inside of each electric cell 10 via its valve 13 moves in an X direction (moves toward the near side in FIG. 5), and is discharged from the smoke discharge duct 62 to the outside of the battery pack 100.

Figure 6:
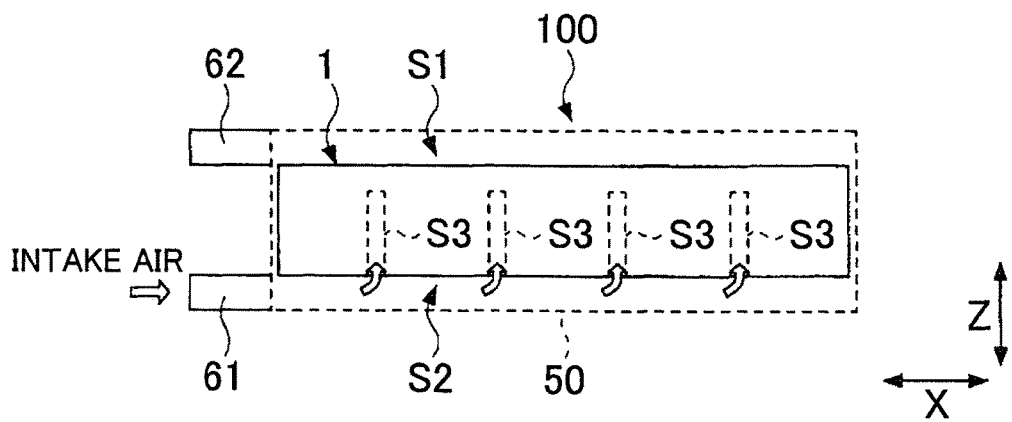
FIG. 6 is a diagram schematically showing the flowing manner of the coolant in the battery pack 100 (in a supply path S2) in a view taken in a Y direction.

FIG. 6 is a diagram schematically showing the flowing manner of the coolant in the battery pack 100 (in the supply paths S2) in a view taken in a Y direction.

As shown in FIG. 6, the air introduced into the supply path S2 via the air intake duct 61 moves in an X direction (moves toward the right side in FIG. 6), and rises in the Z directions and is introduced into cooling paths S3 (streams in the cooling paths S3 will later be described with reference to FIG. 7). The cooling paths S3 are formed between each partition member 30 and an adjacent electric cell 10 as mentioned above. Incidentally, although FIG. 6 illustrates as an example a virtual construction that has only four cooling paths S3 for the sake of simple illustration, the cooling paths S3 are formed between each partition member 30 and its adjacent electric cell 10.

Figure 7:
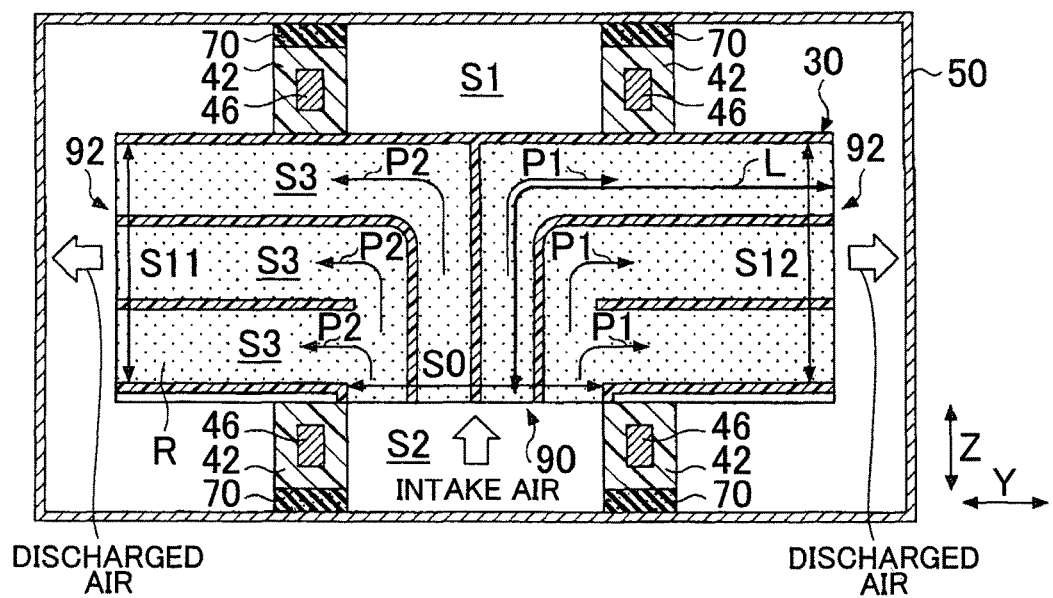
FIG. 7 is a diagram schematically showing the flowing manner of the coolant in the battery pack 100 (in cooling paths S3) in a view taken in an X direction.

FIG. 7 is a diagram schematically showing the flowing manner of the coolant in the battery pack 100 (in the cooling paths S3) in a view taken in an X direction.

As schematically shown by arrows P1 and P2 in FIG. 7, the air introduced through an intake opening 90 into the cooling path S3 from the supply path S2 is restricted in flowing direction by the ribs 32 so that the air flows in the T-shaped course as a whole, and is discharged from discharge openings 92 provided on both sides of the battery stack 1 in the Y directions. Concretely, part of the air introduced into the cooling path S3 via the supply path S2, as schematically shown by the arrows P1, moves in a Z direction from the intake openings 90 (inlet openings) open to the supply path S2 and then turns its direction to the Y direction (to the right side in FIG. 7) and moves sideway (to the right side of the battery stack 1), and then is discharged out of the battery stack 1 through discharge openings 92 formed on the right side of the battery stack 1. Furthermore, other part of the air introduced into the cooling path S3 via the supply path S2, as schematically shown by arrows. P2, moves in the Z direction from the intake openings 90 open to the supply path S2, and then turns its direction to the Y direction (to the left side in FIG. 7) and moves sideway (to the left side of the battery stack 1), and then is discharged out of the battery stack 1 through discharge openings 92 formed on the left side of the battery stack 1. Incidentally, the air discharged out of the battery stack 1 may be discharged to the outside of the battery pack 100 through gaps or the like formed in the pack case 50, or may also be discharged to the outside of the battery pack 100 through the use of an air discharge duct (not shown). In the former case, the air discharge duct can be discarded.

Thus, according to the example shown in FIG. 7, since the cooling-purpose air can be caused to flow in the T-shaped course over the cooling areas of each electric cell 10 (the end surfaces thereof in the X directions), the cooling-purpose air can be discharged out of the battery stack 1 by using the discharge openings 92 formed on the side surface sides of the battery stack 1, without using the smoke discharge path S1 on the upper surface side of the battery stack 1.

Furthermore, since the cooling-purposed air can be caused to flow in the T-shaped courses over the cooling surfaces of each electric cell 10 (the end surfaces thereof in the X directions), the cooling efficiency for the electric cells 10 can be enhanced (which will later be described in detail with reference to FIGS. 8A and 8B). Incidentally, in order to enhance the cooling efficiency, a region R (a dotted region) where air flows is preferably set so as to cover the entire region of each of the end surfaces of each electric cell 10 in the X directions so that the cooling area is maximized. That is, it is desirable that the region R covers the existence region of each electric cell 10.

Furthermore, according to the example shown in FIG. 7, since the gas to be discharged forks into two streams (see the left and right discharge openings 92) as described above, the sectional area S0 of the intake openings 90 is significantly smaller than the sectional area (the sum of S11 and S12) of the discharge openings 92. For example, the sectional area S0 of the intake openings 90 may be within the range of 1/3 to 2/3 of the sectional area of the discharge openings 92. Therefore, the pressure of the cooling-purposed air can be adjusted (or the flow velocity thereof can be adjusted) at the intake openings 90, which is relatively small in sectional area.

Figure 8A:
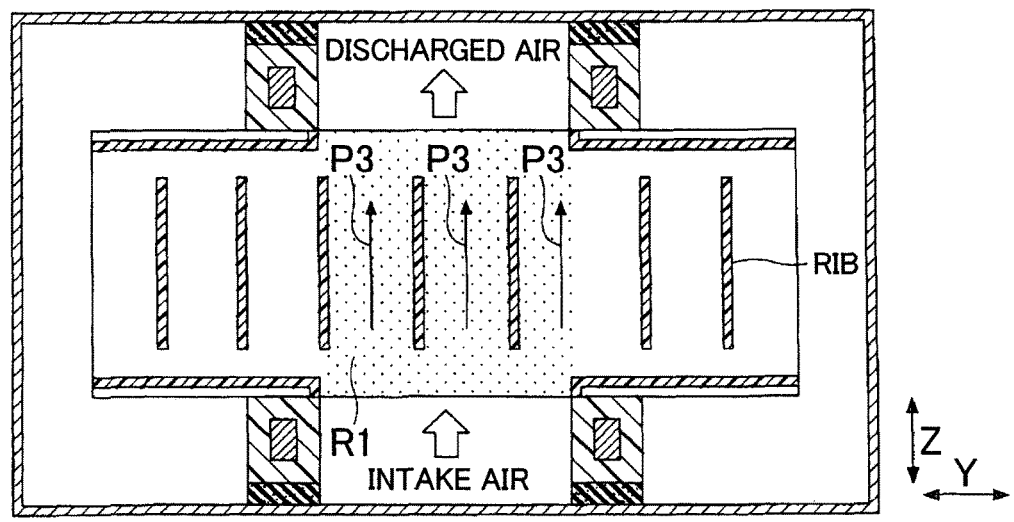
FIGS. 8A and 8B are diagrams each schematically showing a cooling method according to a comparative example.
Figure 8B:
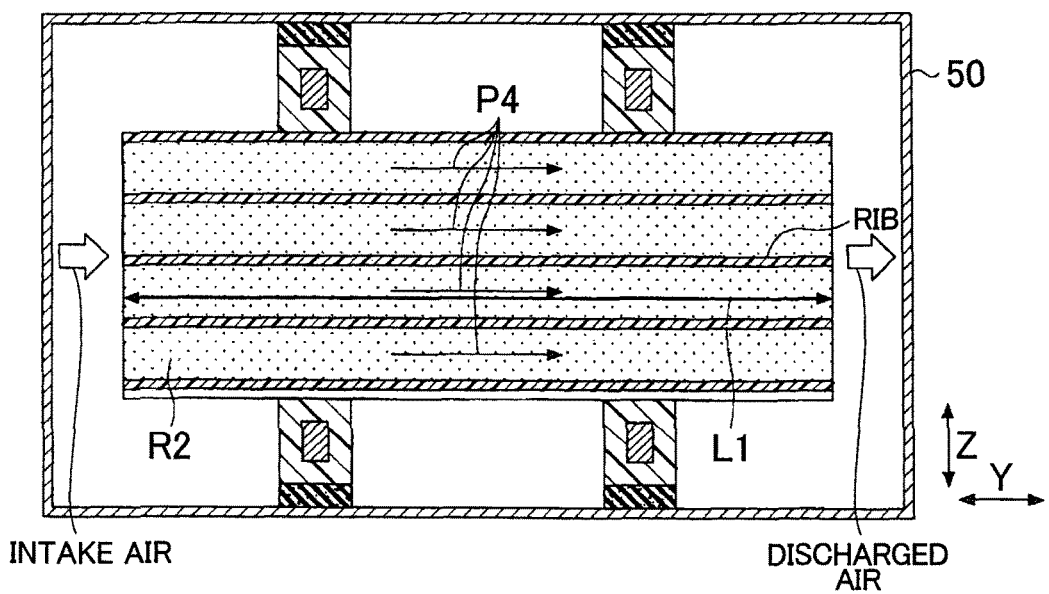

FIG. 8A and FIG. 8B schematically show cooling methods according to comparative examples, and, similar to FIG. 7, schematically show the flowing manners of the coolant on a partition plate. FIG. 8A shows a first comparative example in which the ribs extend in up-down directions so as to cause air to flow in a Z direction. FIG. 8B shows a second comparative example in which the ribs extend in the left-right directions so as to cause air to flow in the Y direction.

In the first comparative example, as schematically shown by arrows P3 in FIG. 8A, the air introduced via an intake opening provided on a lower side of a battery stack flows in the Z direction, and is discharged out of the battery stack through a discharge opening provided on an upper side of the battery stack. Incidentally, in this example, the discharge openings communicate with a smoke discharge path. That is, the smoke discharge path also serves as an air discharge path. In this cooling method, there is a drawback that the cooling area is relatively small due to the limited sectional area of the intake opening (and the limited sectional area of the discharge opening). That is, the sectional area of the discharge opening on the upper surface side of the electric cell 10, in particular, the lateral width of the discharge opening in the Y directions, is restricted because the discharge opening needs to be provided between the positive terminal 11 and the negative terminal 12 of each electric cell 10, and the sectional area of the intake opening is accordingly restricted as well. This results in a drawback that an effective cooling region R1 is small in the Y directions as indicated by dotting in FIG. 8A.

It is to be noted herein that a thermal conductance Q usable as an index that represents the cooling efficiency of each electric cell 10 can be generally expressed as follows.

$$Q = K \cdot S \cdot \sqrt{(V/L)}$$

where K is a coefficient, S is a cooling area, V is the flow velocity of air, and L is a flow path length. Therefore, in the first comparative example, the cooling area S is smaller than in the example shown in FIG. 7, and therefore, the cooling efficiency is lower than in the foregoing example.

In the second comparative example, as schematically shown by arrows P4 in FIG. 8B, the air introduced via intake openings provided on a left side of the battery stack flows in one of the Y directions, and is discharged out of the battery stack through discharge openings provided on a right side of the battery stack. In such a cooling method, a maximum cooling area R2 substantially the same as in the example shown in FIG. 7 can be secured, but the flow path length is longer and the cooling efficiency is lower than in the example shown in FIG. 7 (see the foregoing mathematical expression). Concretely, in the second comparative example, the flow path length L1 corresponds to a width of the electric cell 10 in the Y directions whereas in the example shown in FIG. 7 the flow path length L corresponds approximately to the sum of the length of the partition member 30 (or the electric cell 10) in the Z directions and ½ of the width of the partition member 30 in the Y directions) (see FIG. 7). Therefore, since the sectional shape of the partition member 30 (or the electric cell 10) in a view taken in an X direction is a laterally long rectangle, the flow path length L1 in the second comparative example is longer than the flow path length L in the example shown in FIG. 7.

The foregoing embodiments achieve, particularly, excellent effects as stated below.

According to the embodiments, the lower side of the battery stack 1 is provided with the cooling-purposed air intake openings 90, and the left and right sides of the battery stack 1 are provided with the discharge openings 92, as described above. Therefore, the smoke discharge path S1 can be formed isolatedly from the supply path S2 and the cooling path S3. That is, the gas produced inside the electric cell 10 alone can be independently discharged to the outside of the pack case 50.

Furthermore, as described above, the lower side of the battery stack 1 is provided with the cooling-purposed air intake openings 90, and the left and right sides of the battery stack 1 are provided with the discharge openings 92. Therefore, the cooling-purposed air can be caused to flow in the T-shaped courses over the cooling areas (the end surfaces in the X directions) of each electric cell 10, so that the cooling efficiency for the electric cells 10 can be enhanced.

Furthermore, as described above, the pressure of the cooling-purposed air at the intake opening 90 side can be adjusted by making the sectional area SO of the intake openings 90 smaller than the sectional area (the sum of S11 and S12) of the discharge openings 92. Furthermore, the air discharged from the discharge openings 92 provided on the two opposite sides of the battery stack 1 can be discharged to the outside of the pack case 50 without using any special air discharge duct, so that such air discharge ducts can be discarded.

As described above, since the supply path S2 is defined by the connecting portions 42 of the partition members 30 as described above, the number of component parts can be reduced in comparison with a construction in which the supply path S2 is defined by members other than the partition members 30. However, the connecting portions 42 of the partition members 30 may be discarded, and the supply path S2 may be constructed by using members other than the partition members 30. Furthermore, since the lower-side arresting members 46 are passed through the hollow portions that are formed when the connecting portions 42 of the partition members 30 made of resin are interconnected, it is no longer necessary to separately perform the insulation of the arresting members 46 made of metal.

Furthermore, since the smoke discharge path Si is substantially defined by the connecting portions 42 of the partition members 30 as described above, the number of component parts can be reduced in comparison with a construction in which the smoke discharge path S1 is substantially defined by members other than the partition members 30. However, the connecting portions 42 of the partition members 30 may be discarded, and the smoke discharge path S1 may be constructed by using members other than the partition members 30. Furthermore, since the upper-side arresting members 46 are passed through the hollow portions that are formed when the connecting portions 42 of the partition members 30 made of resin are interconnected, it is no longer necessary to separately perform the insulation of the arresting members 46 made of metal.

While the preferred embodiments of the invention have been described, the invention is not restricted by the foregoing embodiments, but various changes and replacements can be carried out on the foregoing embodiments without departing from the scope of the invention.

Figure 9:
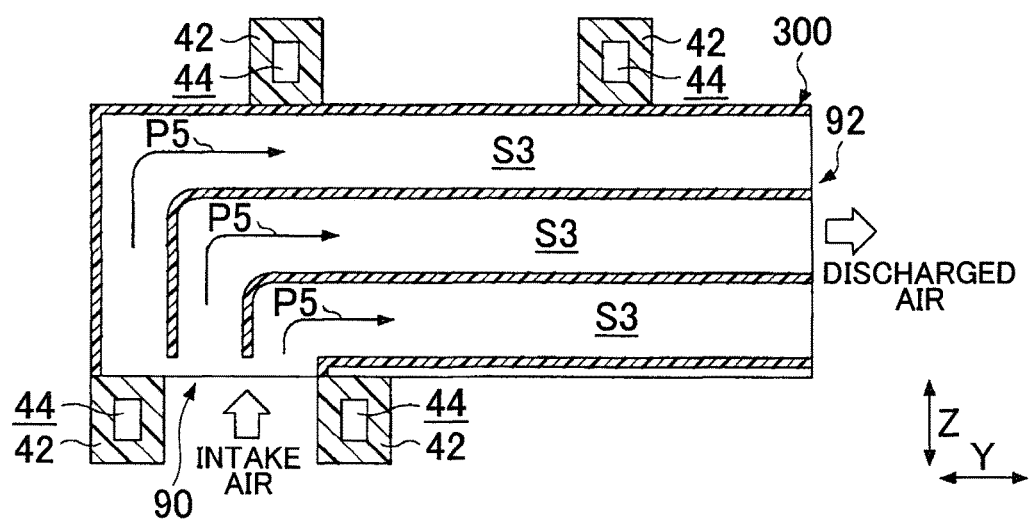
FIG. 9 is a diagram schematically showing a partition member 300 according to another embodiment of the invention.

For example, although in the foregoing embodiments, the cooling-purposed air discharge openings 92 are provided on both sides of the battery stack 1 in the Y directions, the cooling-purposed air discharge opening 92 may be provided only on one of the sides of the battery stack 1 in the Y directions as in a partition member 300 according to another embodiment shown in FIG. 9 (on the right side in the example shown in FIG. 9). In this construction, as schematically shown by arrows P5 in FIG. 9, the air introduced via an intake opening 90 provided on the lower side of the battery stack flows in one of the Z directions, and then turns its direction to one of the Y directions, and is discharged out of the battery stack through a discharge opening 92 provided on the right side of the battery stack. This construction also makes it possible to form a smoke discharge path isolately from the supply path and the cooling path S3 although the flow path length is long.

Furthermore, although in the foregoing embodiment, a plurality of electric cells 10, each being one battery unit, are partitioned from each other by the partition members 30, it is also permissible to provide a plurality of electric cells 10 as a module, and to partition a plurality of modules from each other, each being one battery unit, by partition members 30.

Furthermore, although in the foregoing embodiments, the plurality of electric cells 10 are partitioned from each other by partition members 30, the partition members 30 may be omitted. In this case, the electric cells 10 may be individually insulated (e.g., the end surfaces of each electric cell in the X directions are each provided with an insulation layer). Furthermore, in the case where the partition members 30 are omitted, the construction that corresponds to the ribs 32 of each partition member 30 may be formed on an end surface of each electric cell 10 in the X directions.

Furthermore, although in the foregoing embodiments, the ribs 32 are provided on each partition member 30, it is also permissible to, instead of or in addition to the ribs 32, provide similar ribs on an end surface of each electric cell 10 in the X directions.

Furthermore, although in the foregoing embodiments, the coolant is used to cool the electric cells 10, the coolant may also be used to warm up the electric cells 10 according to need.

The invention claimed is:

1. An electricity storage device comprising:
a plurality of batteries juxtaposed in a first direction to form a battery stack, each battery having a gas discharge valve on a first side, the gas discharge valve being configured to discharge a gas produced inside the battery, the first side being one side of a second direction, and the second direction being orthogonal to the first direction; and
a cooling path placed between the plurality of batteries that face each other in the first direction, a coolant that cools the batteries flowing through the cooling path, and the cooling path having:
an intake opening configured to take in the coolant to the cooling path, the intake opening being provided on a second side that is an opposite side to the first side;
a discharge opening configured to discharge the coolant, the discharge opening being provided on at least one of a third side or a fourth side, the third side and the fourth side being both sides of a third direction, the third direction being orthogonal to the second direction and to the first direction; and
a smoke discharge path provided on the first side of the plurality of batteries, the smoke discharge path configured to discharge the gas discharged from the gas discharge valve to an outside of the battery stack in the first direction without flowing in the cooling path,
wherein the cooling path is partitioned from the smoke discharge path to prevent communication between the cooling path and the smoke discharge path, wherein
the discharge opening is provided on each of the third side and the fourth side,
the cooling path has a T shape in a section orthogonal to the first direction, and
the cooling path includes:
a first path portion that extends from the intake opening toward the first side and then extends toward the third side; and
a second path portion that extends from the intake opening toward the first side and then extends toward the fourth side.

2. The electricity storage device according to claim 1, wherein
a sectional area of the intake opening is smaller than a sum of a sectional area of the discharge opening on the third side and a sectional area of the discharge opening on the fourth side.

3. The electricity storage device according to claim 1, wherein
a sectional area of the intake opening is smaller than a sectional area of the discharge opening.

4. The electricity storage device according to claim 1, further comprising:
a partition plate provided between the plurality of batteries in the first direction, the partition plate having a rib,
wherein the cooling path is at least partially defined by the rib.

5. The electricity storage device according to claim 4, wherein
the rib extends from the second side to the first side in the second direction and turns into the third direction.

6. The electricity storage device according to claim 1, further comprising:
a plurality of partition plates provided between the plurality of batteries in the first direction, each partition plate having connecting portions, the connecting portions protruding at the second side in the second direction, and the connecting portions extending in two rows in the first direction;
a cover member disposed on the second side of the plurality of batteries; and
a supply path configured to supply the coolant to the cooling path, the supply path being at least partially defined by the cover member and the connecting portions of the partition plates.

7. The electricity storage device according to claim 6, wherein
the cover member is made of metal.

8. The electricity storage device according to claim 1, further comprising:
a plurality of partition plates provided between the plurality of batteries in the first direction, each partition plate having connecting portions, the connecting portions protruding at the first side in the second direction, and the connecting portions extending in two rows in the first direction;
a cover member disposed on the first side of the plurality of batteries;
a pair of end plates disposed on both sides of the plurality of batteries in the first direction;
an arresting member having two ends coupled to the pair of end plates, the arresting member extends in the first direction at the first side of the plurality of batteries, and the arresting member being configured to provide arresting force in the first direction to the plurality of batteries; and
wherein the smoke discharge path being at least partially defined by the cover member and the connecting portions,
wherein the connecting portions define, inside the connecting portions, hollow portions that extend in the first direction; and
the arresting member extends in at least one of the hollow portions.

* * * * *